(12) United States Patent
Gaur et al.

(10) Patent No.: US 6,941,292 B2
(45) Date of Patent: Sep. 6, 2005

(54) METHOD AND SYSTEM FOR OPTIMIZING DATA SEARCHES IN TREE STRUCTURES

(75) Inventors: Santosh Prasad Gaur, Raleigh, NC (US); William Eric Hall, Clinton, CT (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 10/065,819

(22) Filed: Nov. 22, 2002

(65) Prior Publication Data

US 2004/0103081 A1 May 27, 2004

(51) Int. Cl.[7] .............................................. G06F 17/30
(52) U.S. Cl. ................. 707/2; 707/1; 707/3; 707/4; 707/104.1; 707/102; 707/100
(58) Field of Search ............................ 707/1, 2, 3, 102, 707/100, 104.1, 101

(56) References Cited

U.S. PATENT DOCUMENTS

| | | | | |
|---|---|---|---|---|
| 3,643,226 A | * | 2/1972 | Loizides et al. ............... | 707/3 |
| 4,677,550 A | * | 6/1987 | Ferguson ....................... | 707/3 |
| 4,751,684 A | | 6/1988 | Holt | |
| 5,167,023 A | | 11/1992 | de Nicolas et al. | |
| 5,172,228 A | | 12/1992 | Israelsen | |
| 5,790,839 A | | 8/1998 | Luk et al. | |
| 6,654,734 B1 | * | 11/2003 | Mani et al. ..................... | 707/2 |
| 2003/0009474 A1 | * | 1/2003 | Hyland et al. ............... | 707/102 |
| 2004/0015494 A1 | * | 1/2004 | Basso et al. ................... | 707/3 |

FOREIGN PATENT DOCUMENTS

| | | | | |
|---|---|---|---|---|
| EP | 0520116 A1 | * | 12/1992 | ............ G06F/15/40 |
| WO | WO 0163852 A1 | * | 8/2001 | ............ H04L/12/56 |

OTHER PUBLICATIONS

IBM Disclosure Bulletin, Shared Folders Efficient Caching Algorithm, Nov. 1991, vol. 34, Issue No. 6, pp. 8–10.*
IBM, TDB, vol. 35, No. 7, Dec. 1992, "Task Switching Between Processes Using the Sequencer".
IBM TDB, vol. 35, 1A, Jun. 1992, "Dual–Bus Arbitration for Personal Computer Systems".
Mandl. et al.,*Elektrotechnik und Informationstechnik*, vol. 115, No. 3, pp. 137–143, 1998, "Real–Time Search–Processor Architectures.".
Yeong, Kang Lai, et al., *Proceedings of 1997 IEEE Intl. Symposium on Circuits and Systems*. Circuits and Systems in the Information Age. ISCAS '97, (Cat. No. 97CH35987), Pt. vol. 2, pp. 1361–1364, vol. 2, Published: New York, NY, USA, 1997, "An Efficient Array Aarchitecture with Data–Rings for 3–Step Hierarchical Search Block Matching Algorithm."
Kondo, T., et al., *IEICE Transactions on Electronics*, vol. E76–C, No. 12, pp. 1827–1834, Dec. 1993, "Single–Board SIMD Processors Using Gate–Array LSIs for Parallel Processing.".
Gay, C., *Elektronik*, vol. 36, No. 12, pp. 94–96, 98, Jun. 12, 1987, T05, West Germany, Memory Supervision with the M68000 Processor. II. "Realisation with the PMMU Component.".

* cited by examiner

*Primary Examiner*—Frantz Coby
(74) *Attorney, Agent, or Firm*—Sawyer Law Group LLP

(57) ABSTRACT

Aspects for optimizing data searches in tree structures are described. The aspects include organizing multiple search levels of data into sub-trees contained in fixed size blocks of shared external memory of an embedded processing system, and requiring each reference to the data to proceed from one-half of a sub-tree during a descent of the search tree based on a search pattern.

17 Claims, 7 Drawing Sheets

Optimization of FM/SM Group Size based on 12 Level Tree

| Reference Size (table size) | Levels/ Reference | Latency/ Reference | Tree Eff. | Tree Search Performance | BusTime/ Reference | Bus Eff. | Memory Bus Resource |
|---|---|---|---|---|---|---|---|
| 1 PSCB (2x4 byte block) | 1 level (12 ref.) | 14 clocks avg. | 7% | 168 clocks avg. | 5.5 cycles avg. | 9% | 66 cycles avg. |
| 3 PSCB's (24 byte block) | 2 levels (6 ref.) | 16 clocks avg. | 13% | 96 clocks avg. | 6 cycles avg. | 17% | 36 cycles avg. |
| 3.5 PSCB's (2x28 byte block) | 3 levels (4 ref.) | 16 clocks avg. | 19% | 64 clocks avg. | 6 cycles avg. | 25% | 24 cycles avg. |
| 7 PSCB's (56 byte block) | 3 levels (4 ref.) | 19 clocks avg. | 16% | 76 clocks avg. | 9 cycles avg. | 17% | 36 cycles avg. |
| 7.5 PSCB's (2x60 byte block) | 4 levels (3 ref.) | 19 clocks avg. | 21% | 57 clocks avg. | 9 cycles avg. | 22% | 27 cycles avg. |
| 15 PSCB's (120 byte block) | 4 levels (3 ref.) | 26 clocks | 15% | 78 clocks | 16 cycles | 13% | 48 cycles |

FIG. 2

Table 2. Optimization of LPM Group Size based on 12 Level Tree

| Reference Size (table size) | Levels/ Reference | Latency/ Reference | Tree Eff. | Tree Search Performance | BusTime/ Reference | Bus Eff. | Memory Bus Resource |
|---|---|---|---|---|---|---|---|
| 1 PSCB (2x7 byte block) | 1 level (12 ref.) | 14 clocks avg. | 7% | 168 clocks avg. | 5.5 cycles avg. | 16% | 66 cycles avg. |
| 1.5 PSCB's (2x21 byte block) | 2 levels (6 ref.) | 16 clocks avg. | 13% | 96 clocks avg. | 6 cycles avg. | 29% | 36 cycles avg. |
| 3.5 PSCB's (2x49 byte block) | 3 levels (4 ref.) | 19 clocks avg. | 16% | 76 clocks avg. | 9 cycles avg. | 29% | 36 cycles avg. |

METHOD AND SYSTEM FOR OPTIMIZING DATA SEARCHES IN TREE STRUCTURES

FIELD OF THE INVENTION

The present invention relates to control structures for tree searches in embedded processing systems.

BACKGROUND OF THE INVENTION

Processing system designers continually seek new ways to improve device performance. While processing speeds continue to increase, the latency imposed by memory access times imposes operating delays. In systems-on-a-chip/embedded systems, efforts to avoid such latency issues have included utilizing local memory in the form of SRAM (static random access memory) on-chip. However, cost and size limitations reduce the effectiveness of the use of SRAM on-chip for some processing environments.

For example, currently in network environments, network switches are being used to perform more complex operations than simple packet forwarding. Network processors are being developed to provide for more complex processing in network routers, while maintaining flexibility to accommodate changes and enhancements to the functionality provided by the routers, as techniques and protocols evolve. As with most any form of processors, these network processors also face challenges in terms of memory utilization, particularly due to the need to handle a vast array of network traffic.

In embedded processing systems, such as network processors, off-chip/external DRAM (dynamic random access memory) is an option that is often chosen due to its lower cost, as compared with SRAM. Thus, while potentially most cost effective, the use of external DRAM introduces a performance penalty in the form of longer access latency (additional delay cycles for the first request for data) relative to other types of RAM. Further, the problem of longer access latency is felt more sharply with shared DRAM, which needs to support concurrent operations required by the system, such as reading in new data from a DMU (data management unit) at the same time that a search for data in the memory is being performed.

In order to facilitate quicker storage and retrieval of data from the DRAM, a tree structure often is employed for the data being stored. For example, a typical tree structure may be from 12 levels to more than 23 levels deep. Such a large number of levels requires multiple requests to memory to obtain all of the necessary data, i.e., to access and utilize the desired leaf of the tree. In addition, with each successive level of the tree, there is more data (unsearched) than the previous level. These factors create further issues regarding how quickly traversal of a tree structure can occur.

Accordingly, what is needed is a system and method for optimization of a tree structure for data stored in external DRAM of an embedded processing system. The present invention addresses such a need.

BRIEF SUMMARY OF THE INVENTION

Aspects for optimizing data searches in tree structures are described. The aspects include organizing multiple search levels of data into sub-trees contained in fixed size blocks of shared external memory of an embedded processing system, and requiring each reference to the data to proceed from one-half of a sub-tree during a descent of the search tree based on a search pattern.

With the organization of PSCBs in a tree structure in accordance with the present invention, optimization of memory latency while descending levels of tree is achieved, since a larger piece of data is referenced and used more than once during descent of the tree, with local subsections of the tree in one piece of memory. In this manner, faster search operations on large tree structures can be realized, which aids in alleviating latency issues that utilization of external, shared memory impose in embedded processing systems. These and other advantages of the present invention will be more fully understood in conjunction with the following detailed description and accompanying drawings.

BRIEF DESCRIPTION OF THE SEVERAL VIEWS OF THE DRAWINGS

FIG. 2 shows a table reflecting optimization of FM/SM group size based on an example of a 12 level tree.

FIG. 4 shows a table reflecting optimization of LPM group size based on a 12 level tree.

DETAILED DESCRIPTION OF THE INVENTION

The present invention relates to control structures for tree searches in embedded processing systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
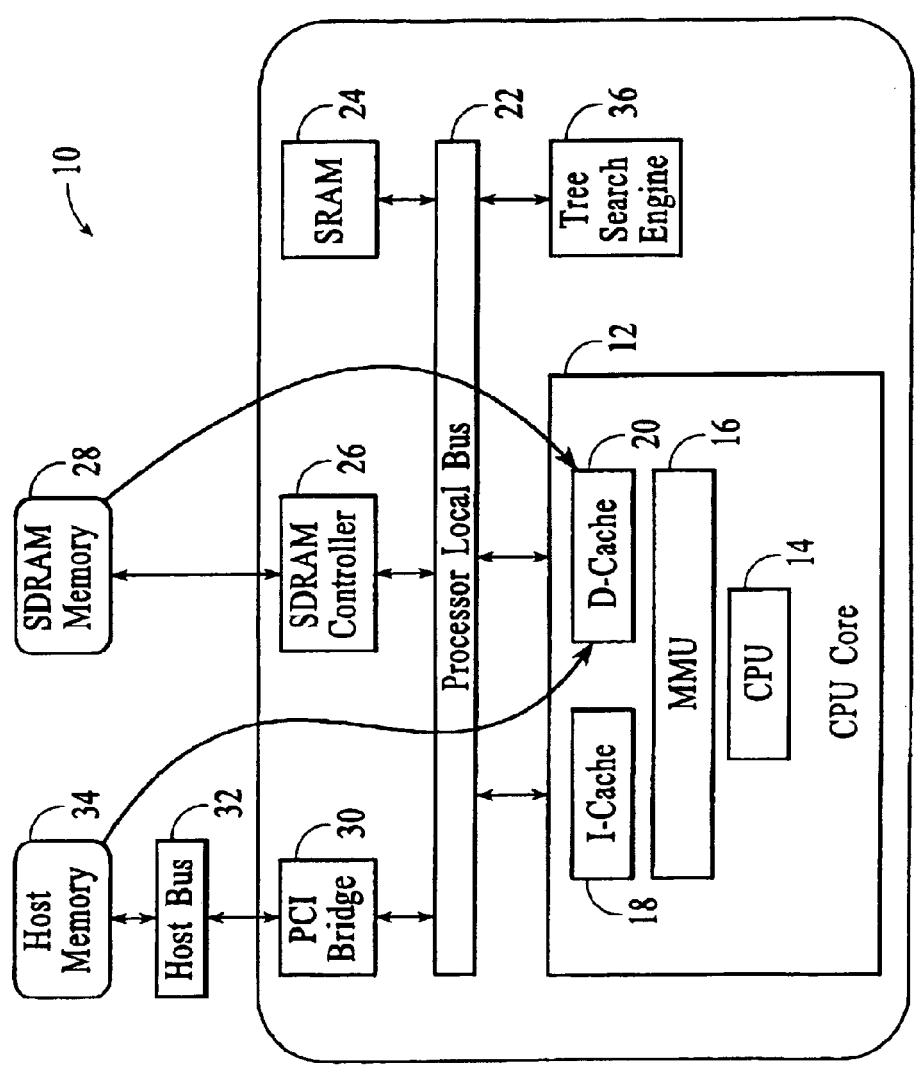
FIG. 1 illustrates an overall block diagram of an embedded processing system.

The present invention present aspects of providing optimal performance in a processing system utilizing shared RAM memories for both data and control storage. An overall block diagram of an embedded processing system applicable for utilization of the present invention is illustrated in FIG. 1. As shown, the system 10 includes a central processing unit (CPU) core 12, the CPU core including a CPU 14, a memory management unit (MMU) 16, an instruction cache (I-cache) 18, and data cache (D-cache) 20, as is well appreciated by those skilled in the art. A processor local bus 22 couples the CPU core 12 to on-chip SRAM 24. Further coupled to the bus 22 is SDRAM (synchronous DRAM) controller 26, which is coupled to off-chip/external SDRAM 28. A PCI (peripheral component interconnect) bridge 30 is also coupled to bus 22, the PCI bridge 30 further coupled to a host bus 32 that is coupled to host memory 34. As shown, a tree search engine 36 is also included and coupled to bus 22. The tree search engine 36 is a hardware assist that performs pattern analysis through tree searches to find the address of a leaf page for read and write accesses in the SDRAM 28.

In accordance with the present invention, the searches performed by the tree search engine 36 are improved with the optimization of a tree structure for data stored in external DRAM 28 of an embedded processing system. In general, tree searches, retrievals, inserts, and deletes are performed according to a key. Information is stored in the tree in leaves, which contain the keys as a reference pattern. To locate a leaf, a search algorithm processes input parameters that include the key pattern, and then accesses a direct table (DT) to initiate the walking of the tree structure through pattern search control blocks (PSCBs). The searches occur based on a full match (FM) algorithm, a longest prefix match (LPM) algorithm, or a software management tree (SM) algorithm. The present invention provides a tree structure of PCSBs optimized for all three types of search algorithms, as described hereinbelow.

An optimization of a tree structure in accordance with the present invention is provided by organizing multiple search levels into sub-trees of PSCBs contained in fixed size blocks of memory and requiring only the left or right side of each sub-tree during each descent of the search tree with the choice of left or right known before the reference of each sub-tree to reduce the size of the required reference.

Preferably several parameters are considered in determining the organization, including: a latency per reference number, which is determined by the latency of a memory burst reference plus an adjustment for the expected average bank busy delays; a bus time per reference number, which is determined by the number of memory data bus cycles needed for a memory burst reference plus again the same adjustment for the expected average bank busy delay; a tree search efficiency percentage, which is a metric of the relative per clock search efficiency; a tree search performance number, which is a calculation of the search time portion of the total table lookup performance; a memory bus efficiency percentage, which is a metric of the relative efficiency of the bus usage during the search portion of the table lookup process; and a memory bus resource number, which is a calculation of the memory resources used during the search portion of the table lookup process. The determination of the organization according to the parameters occurs via the following equations for FM and SM:

References=Levels (e.g., 12)/Levels_per_Reference

Tree_Search_Efficiency=Levels_per_Reference/ Latency_per_Reference

Tree_Search_Performance=References*Latency_per_ Reference

FM_SM_Usage=FM_SM_PSCB_Size (e.g., 4)/Effective_Bus_Size (e.g., 8)

Memory_Bus_Efficiency=(Levels_per_Reference/ Bus_Time_per_Reference)*

FM_SM_Usage

Memory_Bus_Resource=References*Bus_Time_ per_Reference

Table 1 in FIG. 2 shows optimization of FM/SM group size based on an example of a 12 level tree. The optimum solution was developed in two parts, the first being the organization of multiple search levels into sub-trees contained in fixed size blocks of memory. The second part was the observation that only the left or right side of each sub-tree is required during each decent of the search tree and the choice of left or right is known before the reference of each sub-tree thus reducing the size of the required reference. The 3, 7, and 15 PSCB cases are based on the first part of the solution only, and the 3.5 and 7.5 cases are the extensions of the 7 and 15 PCSB cases respectively based on the second part of the solution.

Figure 3A:
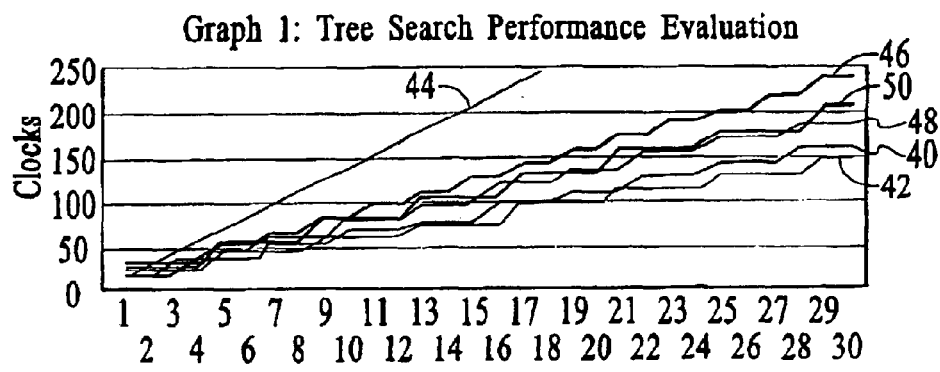
FIGS. 3a and 3b present graphs for the results of evaluating the performance and resource usage for a wide range of possible tree depths (1 through 30) for FM and SM searches.
Figure 3B:
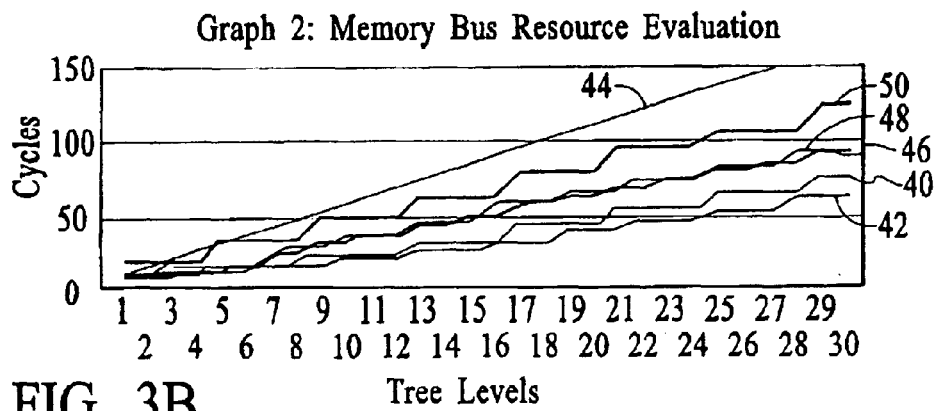

The results of evaluating the performance and resource usage for a wide range of possible tree depths (1 through 30) for FM and SM searches can be seen in Graphs 1 and 2 shown in FIGS. 3a and 3b, respectively. It can be seen in the graphs that the 3.5 PSCBs (plot line 40) and the 7.5 PSCBs (plot line 42) cases are better in both performance and resource usage than all the other FM and SM solutions and show significant improvements over the 1 PSCB (plot line 44) control case. Plot line 46 shows the 3 PSCBs case, plot line 48 shows the 7 PSCBs case, and plot line 50 shows the 15 PSCBs case. As appears from Graph 1, the performance of the 7.5 case is better at most depths than the 3.5 case but that in Graph 2, the resource usage of the 3.5 case is better at most depths than the 7.5 case.

Figure 3C:
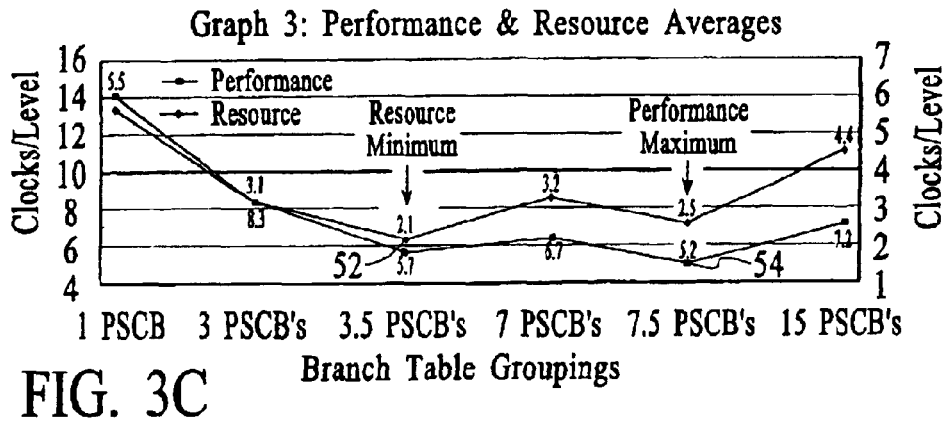
FIG. 3c presents a graph of the overall per level average or slope of the curves performance and resource usage Graphs 1 and 2 of FIGS. 3a and 3b.

The overall per level average or slope of the curves performance and resource usage Graphs 1 and 2 can be seen in Graph 3 in FIG. 3c. As shown in Graph 3, the resource minimum is at the 3.5 PSCB's point (node 52) and the performance maximum (clock minimum) is at the 7.5 PSCBs point (node 54). The performance difference between the two points is 0.5 clocks per level and the resource difference is 0.4 cycles per level. It has been found that a five tenths of a clock improvement in performance is worth the four tenths of a cycle increase in resource usage making the 7.5 PSCB's case the optimum solution for FM and SM tree searches in the example embodiment.

Table 2 of FIG. 4 shows optimization of LPM group size based on 12 level tree. The 1.5 and 3.5 cases are based on both parts of the solution and require similar block sizes as the 3.5 and 7.5 cases of Table 1 of FIG. 2, respectively. The memory bus efficiency calculation has changed to reflect the difference in the LPM PSCB size:

LPM_Usage=LPM_PSCB_Size (e.g., 7)/Effective_ Bus_Size (e.g., 8)

Memory_Bus_Efficiency=(Levels_per_Reference/ Bus_Time_per_Reference)

*LPM_Usage

As can be seen in Table 2, the 3.5 solution has the best performance while having the same resource usage as the 1.5 case making the 3.5 solution the optimum solution for LPM tree searches with the added benefit of using the same block size as the 7.5 PSCB's case from the FM and SM tree search solution.

Figure 5:
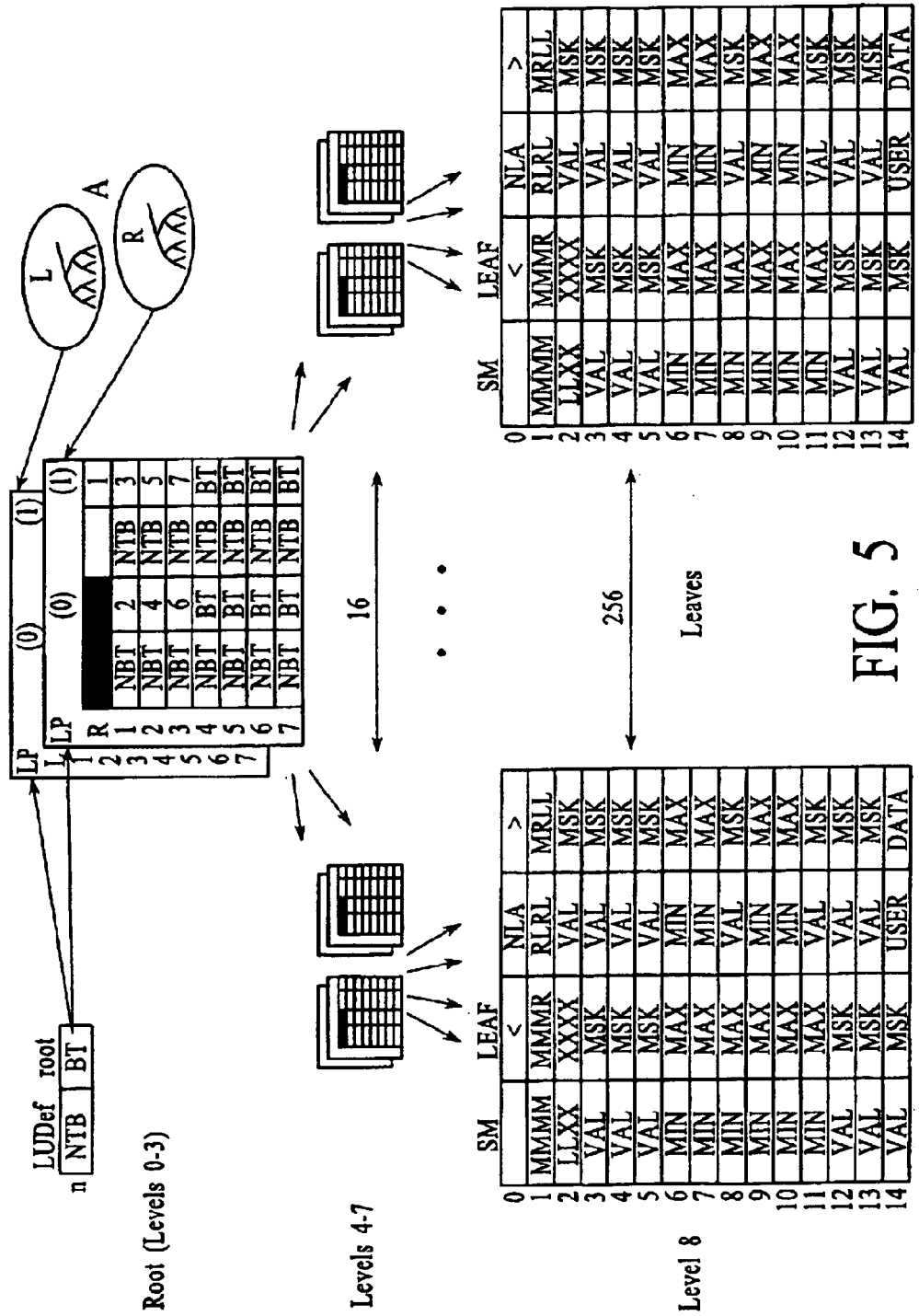
FIG. 5 illustrates a search tree structure of PSCBs in accordance with the present invention.

FIG. 5 illustrates a search tree structure of PSCBs in accordance with the present invention. By way of example, a search of the tree in FIG. 5 begins with the memory access request of the left or right half of the Root or level 0 Branch Table (BT) based on the Next Bit Test (NBT) result from the Lookup Definition (LUDef) or Direct Table (DT, not shown) entry for this search tree. The access of the first branch table half contains the optimum number of levels of PSCBs of the tree for the search type. If after descending through the first table an external (lower) branch table address is arrived at instead of a leaf address, then an additional memory access request would be made for only the left or right half of this lower branch table. This process continues until a leaf address is arrived at during the descent through the lower branch table halves. When the search arrives at a leaf address, the process terminates with a memory access request for the leaf data to determine if a match was found. The leaf structure for the leaves shown in FIG. 5 is described more particularly in co-pending U.S. patent application, filed Nov. 22, 2002, Ser. No. 10/065,826, assigned to the assignee of the present invention, and incorporated herein by reference in its entirety.

Figure 6A:
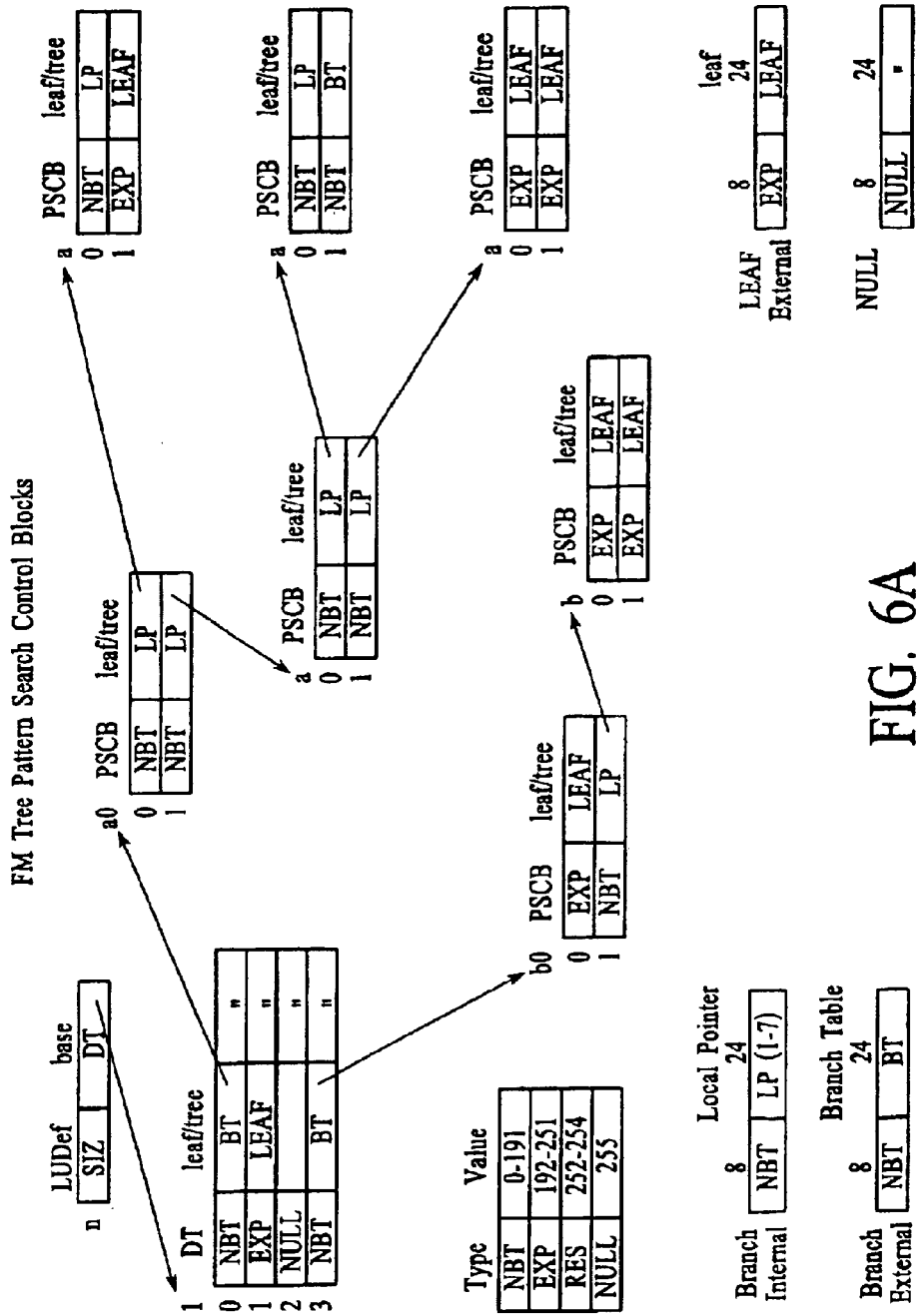
FIGS. 6a, 6b, and 6c illustrate organization of PSCBs for FM, LPM and SMT algorithms in accordance with the present invention.
Figure 6B:
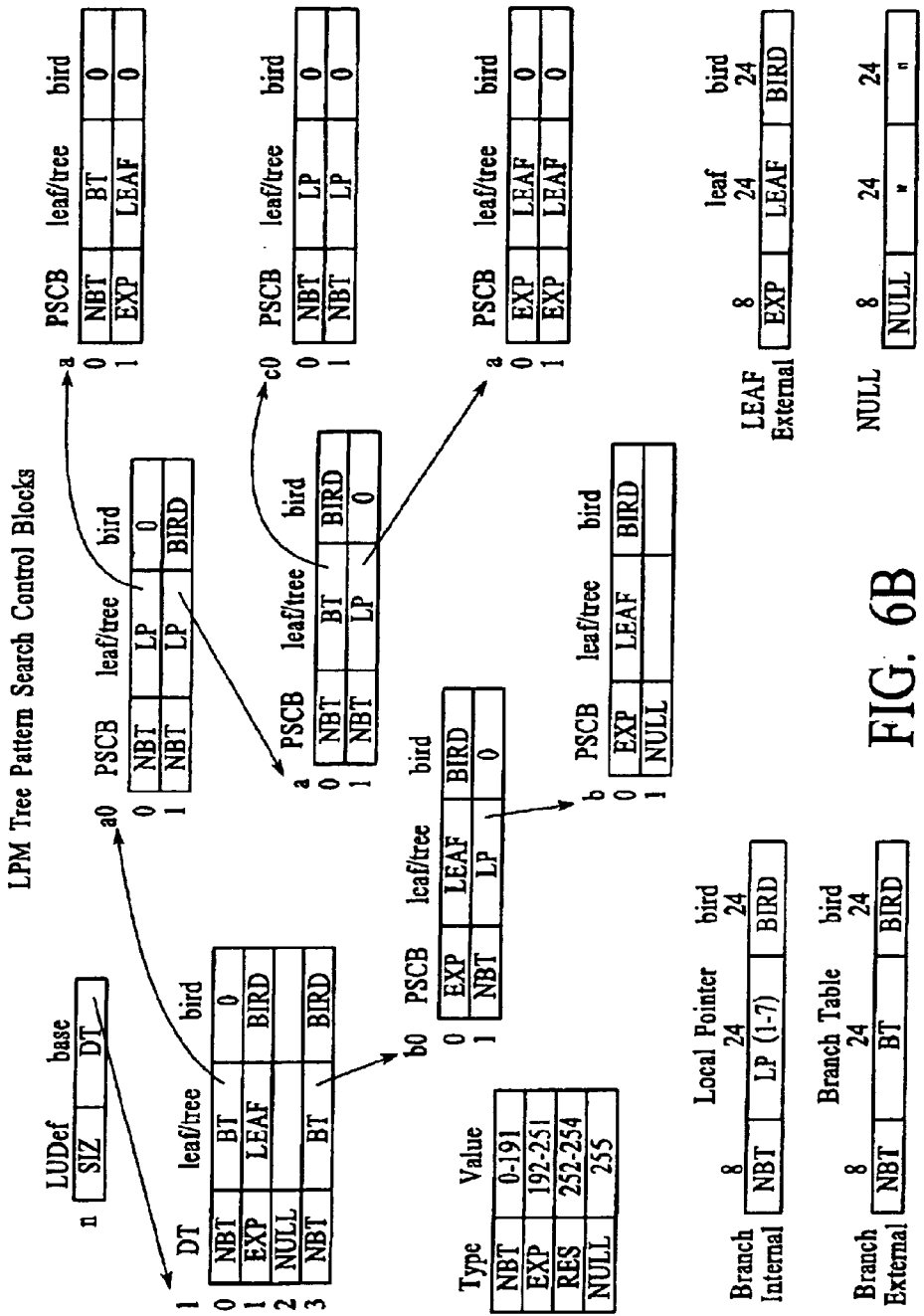
Figure 6C:
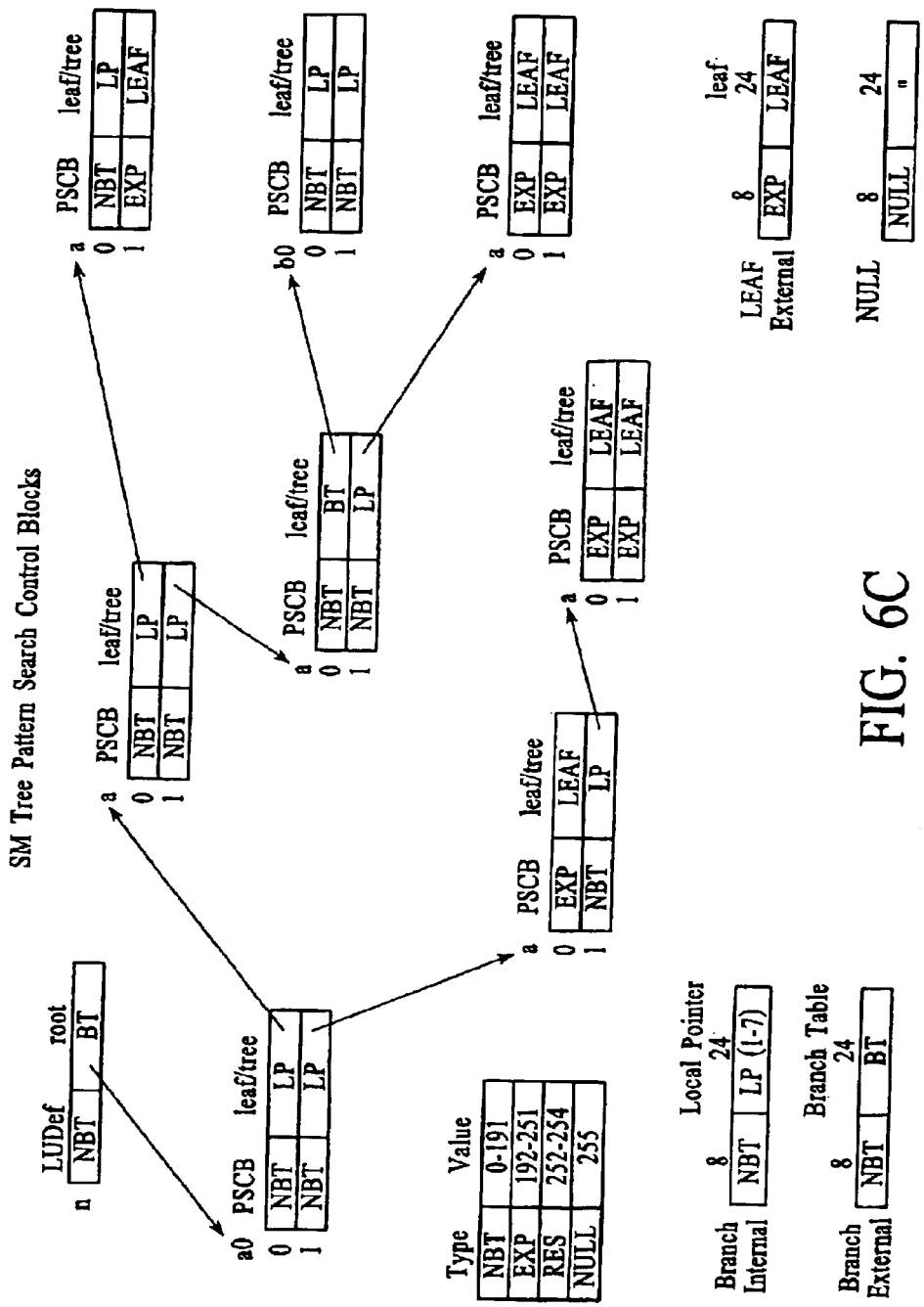

Representations of a basic organization of PSCBs for each type of search algorithm, FM, LPM, and SM, are illustrated in FIGS. 6a, 6b, and 6c. In each of these figures, local pointer (LP) values provide reference to a table within the retrieved data, and traversal based on a LP is illustrated by the dashed arrows. Branch table (BT) values provide reference to a table outside of the retrieved data, and traversal based on a BT value is illustrated by the solid arrows. EXP value provide expiration data for found LEAF data.

With the organization of PSCBs in a tree structure in accordance with the present invention, optimization of memory latency while descending levels of tree is achieved, since a larger piece of data is referenced and used more than once during descent of the tree, with local subsections of the tree in one piece of memory. In this manner, faster search operations on large tree structures can be realized, which aids in alleviating latency issues that utilization of external, shared memory impose in embedded processing systems.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for optimizing data searches in tree structures, the method comprising:
    organizing multiple search levels of data into sub-trees contained in fixed size blocks of shared external memory of an embedded processing system; and
    requiring each reference to the data to proceed from one-half of a sub-tree during a descent of the search tree based on a search pattern.

2. The method of claim 1 further comprising choosing the one-half before the descent from a root level of the search tree to reduce the size of the required reference.

3. The method of claim 2 wherein the step of choosing further comprises choosing the one-half based on a next bit test value of a bit in the search pattern.

4. The method of claim 3 wherein the one-half further comprises a right side or left side of a branch table of the sub-tree.

5. The method of claim 1 wherein organizing multiple search levels further comprises organizing the sub-trees to provide multiple levels of data with each reference.

6. A system for optimizing data searches in tree structures, the system comprising:
    an embedded processor, the embedded processor including a tree search engine; and
    external memory coupled to the embedded processor, the external memory containing multiple search levels of data as sub-trees in fixed size blocks and providing data from one-half of a sub-tree during a search tree descent by the tree search engine based on a search pattern.

7. The system of claim 6 wherein the tree search engine chooses the one-half before the descent from a root level of the search tree to reduce the size of a required reference.

8. The system of claim 7 wherein the tree search engine chooses the one-half based on a next bit test value of a bit in the search pattern.

9. The system of claim 8 wherein the one-half further comprises a right side or left side of a branch table of the sub-tree.

10. The system of claim 6 wherein the multiple search levels further comprise organized sub-trees that provide multiple of data with each reference.

11. A method for optimizing data searches in tree structures, the method comprising:
    utilizing external memory in an embedded processing system;
    organizing the external memory in multiple search levels of data as sub-trees in fixed size blocks; and
    providing data from one-half of a sub-tree during a search tree descent by a tree search engine based on a search pattern.

12. The method of claim 11 further comprising choosing the one-half before the descent from a root level of the search tree to reduce the size of a required reference.

13. The method of claim 12 wherein the step of choosing further comprises choosing the one-half based on a next bit test value of a bit in the search pattern.

14. The method of claim 13 wherein the one-half further comprises a right side or left side of a branch table of the sub-tree.

15. The method of claim 11 wherein organizing multiple search levels further comprises organizing the sub-trees to provide multiple levels of data with each reference.

16. A computer readable medium containing program instructions for optimizing data searches in tree structures, the program instructions comprising:
    organizing multiple search levels of data into sub-trees contained in fixed size blocks of shared external memory of an embedded processing system; and
    requiring each reference to the data to proceed from one-half of a sub-tree during a descent of the search tree based on a search pattern.

17. A computer readable medium containing program instructions for optimizing data searches in tree structures, the program instructions comprising:
    utilizing external memory in an embedded processing system;
    organizing the external memory in multiple search levels of data as sub-trees in fixed size blocks; and
    providing data from one-half of a sub-tree during a search tree descent by a tree search engine based on a search pattern.

* * * * *